(No Model.)

W. H. HOFFMAN.
RAIL SPLICE FOR RAILWAYS.

No. 371,584. Patented Oct. 18, 1887.

Witnesses
J. W. McEvers.
R. L. Van Denburg.

Inventor
William H. Hoffman.
By his Attorney F. S. Davenport

UNITED STATES PATENT OFFICE.

WILLIAM H. HOFFMAN, OF JERSEYVILLE, ILLINOIS.

RAIL-SPLICE FOR RAILWAYS.

SPECIFICATION forming part of Letters Patent No. 371,584, dated October 18, 1887.

Application filed July 5, 1887. Serial No. 243,376. (No model.)

*To all whom it may concern:*

Be it known that I, WILLIAM H. HOFFMAN, of Jerseyville, in the county of Jersey and State of Illinois, have invented a new and Improved Rail-Splice for Railways; and I do hereby declare that the following is a full and exact description of the same, reference being had to the accompanying drawings, and to the letters of reference marked thereon.

My invention relates to an improvement in railway-rails; and it consists in providing the nuts on the bolts of the rail-joints with novel locking mechanism.

My invention further consists in so forming the under side of the rail that it will afford a convenient and secure covering for an electric wire or cable.

The above-named features of improvement are fully described in the following specification and illustrated in the accompanying drawings, in which—

Figure 1:
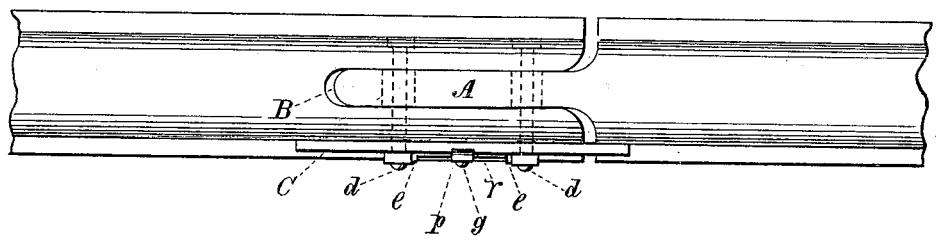
Figure 2:
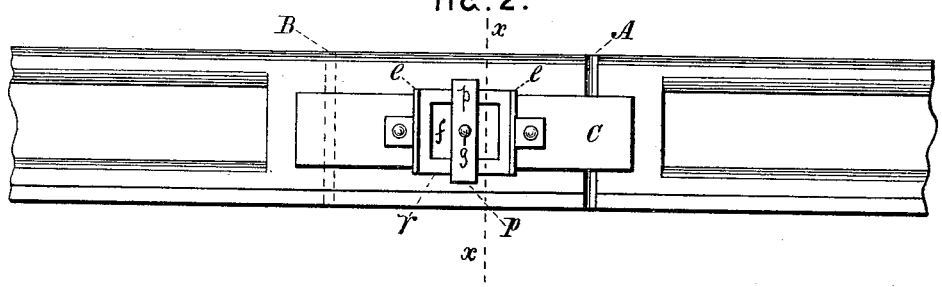
Figure 3:
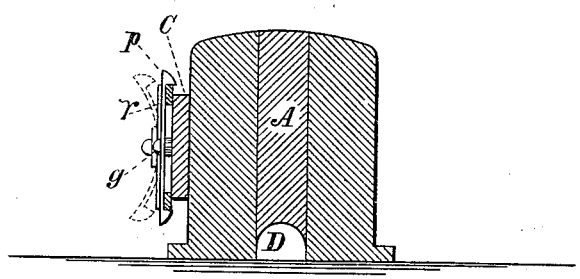

Figure 1 is a plan view of the rail splice or joint. Fig. 2 is a side elevation, and Fig. 3 is a transverse section, of the same, taken in the line *x x*, Fig. 2. For the purpose of more clearly illustrating the nut-locking mechanism, Fig. 3 is drawn to a larger scale.

In the figures, A and B represent, respectively, the tongue on the end of one rail and the corresponding bifurcation or cleft on the end of the adjoining rail, both ends of said rails, to a distance a little greater than the length of the splice from the end of each toward the central part thereof, being made full—that is, without the ordinary neck—from the head downward, as shown in transverse section in Fig. 3.

Secured to the outside flat part of the rails is a fish-plate, C, held in position by two bolts, *d d*, which also serve to clamp the rail-splice, the heads of said bolts being countersunk into the side of the rail, as shown in dotted lines in Fig. 1. It will be observed that the holes in the tongue A, through which the bolts *d* pass, are elongated to allow for the longitudinal expansion and contraction of the rails, the nuts on the bolts being set up, so as to secure the parts snugly together, yet allow the longitudinal motion due to change of temperature.

To securely lock the nuts upon the bolts *d d*, I employ a rectangular guard-plate, *r*, having a large central opening, *f*, and preferably turned up at each end, so as to form flanges *e*, the latter adapted to butt against the sides of the nuts, as shown in Fig. 2. To secure said plate in position, and yet admit of its being easily removed, and also to prevent the possibility of that jarring of parts frequently a serious objection in rail-joints, I secure to the middle of the fish-plate, by a rivet, *g*, or otherwise, the central part of a double gib-headed spring, *p*, the distance between the two gib-heads being such as to include the breadth of the guard-plate *r*, the upper and lower edges of which it overhangs, and thus secures the plate in position, while the flanged ends thereof prevent the possibility of the nuts turning or becoming loose.

To remove the guard-plate for the purpose of loosening the nuts, it is only necessary to draw back, as shown in dotted lines in Fig. 3, the heads of the spring *p*, and then slide the guard-plate either up or down, passing first one end and then the other over the ends or heads of the spring.

To make the rails available for covering and protecting an electric wire or cable, I form the under side with an inverted semicircular channel, D, (see Fig. 3,) extending the entire length of the rail and adapted to cover a cable or wires supported upon the ties.

Having fully described my invention, what I claim as new, and desire to secure by Letters Patent, is—

1. In a rail splice, the combination, with the fish-plate, of a nut-lock consisting of a guard-plate, *r*, adapted to slide vertically between and butt against the sides of the nuts of the bolts *d*, said plate being retained in position by a gib-headed spring, *p*, the latter secured at the center to the middle of the fish-plate, all constructed and adapted to operate substantially as and for the purpose set forth.

2. A T-headed railway-rail consisting of a single piece or bar, the under side thereof provided with a channel, D, as and for the purpose specified.

In testimony that I claim the foregoing I have hereunto set my hand this 20th day of June, 1887.

WILLIAM H. HOFFMAN.

Witnesses:
J. W. MCEVERS,
W. H. MILLER.